UNITED STATES PATENT OFFICE.

WILLIAM D. GROFF, OF MARIETTA, PENNSYLVANIA.

MANUFACTURE OF THE LEAVES OF THE SUNFLOWER AND RHUBARB PLANTS AS A SUBSTITUTE FOR SMOKING-TOBACCO AND FOR THE FORMATION OF CIGARS.

Specification forming part of Letters Patent No. 1,066, dated January 8, 1839.

*To all whom it may concern:*

Be it known that I, WILLIAM D. GROFF, of Marietta, in the county of Lancaster and State of Pennsylvania, have made a new and useful discovery and Improvement in the Manufacture of Cigars—to wit, their manufacture from the leaf of the sunflower or rhubarb, or both combined; and I do hereby declare that the following is a full and exact description.

I cut the sunflower before its decline, at the time the seed ripens and the leaf is in full vigor. As soon as it is cut down it is hung under a shade to be dried in the air. When the leaves are sufficiently dried they are pulled from off the stocks and pressed, in order to sweat and season them, for about eight weeks. They are then fit for use. The leaf of the rhubarb may be cured as well as the sunflower in the same manner as that in which the tobacco-leaf is, and the cigar is made in the same manner as the common cigar.

I sometimes put a wrapper of the tobacco-leaf around the cigar for the benefit of those long accustomed to the taste of the tobacco cigar. I also make what is called "cut and dry," after the leaves are cured in the manner above described, by mixing or taking them separately, cutting them fine, and packing them.

What I claim as my improvement consists of—

A new manufacture of the prepared leaves of the sunflower and rhubarb plant, separately or combined, for the formation of cigars, and to be used as a substitute for tobacco in smoking, as above set forth.

WM. D. GROFF.

Witnesses:
SAML. DALE,
LEAH L. DALE.